United States Patent [19]

Otsuka et al.

[11] Patent Number: 5,454,096
[45] Date of Patent: Sep. 26, 1995

[54] STORAGE MANAGEMENT SYSTEM FOR MEMORY CARD USING MEMORY ALLOCATION TABLE

[75] Inventors: Kikuo Otsuka; Mikio Watanabe, both of Tokyo, Japan

[73] Assignee: Fuji Photo Film Co., Ltd., Kanagawa, Japan

[21] Appl. No.: 384,452

[22] Filed: Feb. 3, 1995

Related U.S. Application Data

[63] Continuation of Ser. No. 8,825, Jan. 25, 1993, which is a continuation of Ser. No. 523,685, May 15, 1990.

[30] Foreign Application Priority Data

May 29, 1989 [JP] Japan ................... 1-132695

[51] Int. Cl.⁶ ........................... G06F 12/02
[52] U.S. Cl. ............. 395/401; 364/970; 364/967.5; 364/963.3; 364/245; 364/255.7; 395/442; 395/490; 395/497.04; 395/421.11; 358/339
[58] Field of Search ............................. 395/425

[56] References Cited

U.S. PATENT DOCUMENTS

| | | | |
|---|---|---|---|
| 4,511,964 | 4/1985 | Georg et al. | 364/200 |
| 4,536,837 | 8/1985 | Olson et al. | 364/200 |
| 4,787,060 | 11/1988 | Boudrehu et al. | 364/200 |
| 4,941,059 | 7/1990 | Grant | 360/72.2 |
| 5,008,786 | 4/1991 | Thatte | 364/200 |
| 5,016,107 | 5/1991 | Sasson et al. | 358/209 |
| 5,018,017 | 5/1991 | Sasaki et al. | 358/209 |
| 5,029,125 | 7/1991 | Sciupac | 364/900 |
| 5,068,744 | 11/1991 | Ito | 358/310 |

FOREIGN PATENT DOCUMENTS

| | | |
|---|---|---|
| 0066766 | 12/1982 | European Pat. Off. . |
| 63-286077 | 11/1988 | Japan . |

OTHER PUBLICATIONS

Patent Abstracts of Japan, vol. 13, No. 114 (E–730) 20 Mar. 1989 & JP-A-63 286 077 (Fuji Photo Film Co., Ltd.) 22 Nov. 1988.

IBM Technical Disclosure Bulletin, vol. 30, No. 12, May 1988, New York US p. 280 Disclosed Anonymously: General–purpose memory allocation interface.

Sotware Practice & Experience, vol. 18, No. 6, Jun. 1988, Chichester GB pp. 561–581; P. Hobley et al.: "A Recovery Block Scheme for A VAX11/750 Running Unix", pp. 566–577.

(List continued on next page.)

Primary Examiner—Kevin A. Kriess
Assistant Examiner—Lucien U. Toplu
Attorney, Agent, or Firm—Sughrue, Mion, Zinn, Macpeak & Seas; Richard C. Turner

[57] ABSTRACT

A storage management system for a memory card, which has a storage area divided into a plurality of storage units having a predetermined storage capacity. manages the storage of information in every storage unit. The storage area includes a memory allocation table (MAT) for indicating the relationship of the storage units in which a group of mutually associated information is to be stored, and a directory for indicating one of the storage units in which the beginning portion of the group of mutually associated information is to be stored. Either the MATs or the directories indicate whether or not the storage management system inhibits writing or erasing of the information in the storage units associated with the MATs or the directories. The system further includes a storage unit table which indicates whether those storage units specified by the MATs are empty or occupied. The storage unit table is set up after searching the directories to trace the MATs associated with the directories in use, prior to writing information in the memory card. In this way, image data are efficiently managed to improve reliability of the storage management system.

6 Claims, 14 Drawing Sheets

| AREA | ADDRESS (HEXADECIMAL) | BYTES | CONTENTS |
|---|---|---|---|
| HEADER | 000000 | 1 | CARD No. |
| | 000001~0004 | 4 | KIND OF MEMORY |
| | 000005~0006 | 2 | REMAINING CLUSTERS |
| | 000007~0008 | 2 | PACKETS IN USE |
| | 000009~03FF | 1015 | USER AREA |
| PACKET INFORMATION AREA | 000400~0402 | 3 | CONTENTS OF PACKET 1 CLUSTERS IN USE |
| | 000403~0405 | 3 | CONTENTS OF PACKET 2 CLUSTERS IN USE |
| | ʃ | ʃ | ʃ |
| | 000FFA~0FFC | 3 | CONTENTS OF PACKET 1023 CLUSTERS IN USE |
| | 000FFD~0FFF | 3 | DUMMY AREA |
| DIRECTORY | 001000~1001 | 2 | PACKET 1 START CLUSTER |
| | 001002~1003 | 2 | PACKET 2 START CLUSTER |
| | ʃ | ʃ | ʃ |
| | 0017FC~17FD | 2 | PACKET 1023 START CLUSTER |
| | 0017FE~17FF | 2 | DUMMY AREA |
| MAT | 001800~1801 | 2 | CLUSTER 1 MAT |
| | 001802~1803 | 2 | CLUSTER 2 MAT |
| | ʃ | ʃ | ʃ |
| | 001FFD~1FFD | 2 | CLUSTER 1023 MAT |
| | 001FFE~1FFF | 2 | DUMMY AREA |
| DATA | 002000~ | | IMAGE DATA (INCL. HEADER INFORMATION) |

OTHER PUBLICATIONS

The Computer Journal, vol. 29, No. 2, Apr. 1986, London GB pp. 127–134; "N. M. Pitman al.: Buddy Systems With Selective Splitting", p. 128.

Proceedings 12th Annual Int. Symp. On Computer Architecture Jun. 17–19, 1985 Boston, US pp. 84–90 A. Ram et al.: "Parallel; Garbage Collection Without Synchronization Overhead" pp. 88–87.

Peter Norton, Inside The IMB PC, 1983, pp. 80–93 and 99–112 Madnick et al., Operating Systems, 1974 pp. 114–125.

Fig. 2

| AREA | ADDRESS (HEXADECIMAL) | BYTES | CONTENTS |
|---|---|---|---|
| HEADER | 000000 | 1 | CARD No. |
| | 000001~0004 | 4 | KIND OF MEMORY |
| | 000005~0006 | 2 | REMAINING CLUSTERS |
| | 000007~0008 | 2 | PACKETS IN USE |
| | 000009~03FF | 1015 | USER AREA |
| PACKET INFORMATION AREA | 000400~0402 | 3 | CONTENTS OF PACKET 1 CLUSTERS IN USE |
| | 000403~0405 | 3 | CONTENTS OF PACKET 2 CLUSTERS IN USE |
| | ≀ | ≀ | ≀ |
| | 000FFA~0FFC | 3 | CONTENTS OF PACKET 1023 CLUSTERS IN USE |
| | 000FFD~0FFF | 3 | DUMMY AREA |
| DIRECTORY | 001000~1001 | 2 | PACKET 1 START CLUSTER |
| | 001002~1003 | 2 | PACKET 2 START CLUSTER |
| | ≀ | ≀ | ≀ |
| | 0017FC~17FD | 2 | PACKET 1023 START CLUSTER |
| | 0017FE~17FF | 2 | DUMMY AREA |
| MAT | 001800~1801 | 2 | CLUSTER 1 MAT |
| | 001802~1803 | 2 | CLUSTER 2 MAT |
| | ≀ | ≀ | ≀ |
| | 001FFC~1FFD | 2 | CLUSTER 1023 MAT |
| | 001FFE~1FFF | 2 | DUMMY AREA |
| DATA | 002000~ | | IMAGE DATA (INCL. HEADER INFORMATION) |

Fig. 4A

| PACKET No. | FIRST CLUSTER No. | | | | |
|---|---|---|---|---|---|
| DIR 1 | 1 | | 1 | | 1 |
| 2 | 4 | ⇒ | 0 | ⇒ | 4 |
| 3 | 7 | | 7 | | 7 |

Fig. 4B

| CLUSTER No. | MAT VALUES (HEXADECIMAL) | | |
|---|---|---|---|
| MAT 1 | 0002 | 0002 | 0002 |
| 2 | 0003 | 0003 | 0003 |
| 3 | FFFF | FFFF | FFFF |
| 4 | 0005 | 0000 | 0005 |
| 5 | 0006 | 0000 | 0006 |
| 6 | FFFF | 0000 | 000A |
| 7 | 0008 | 0008 | 0008 |
| 8 | 0009 | 0009 | 0009 |
| 9 | FFFF | FFFF | FFFF |
| 10 | 0000 | 0000 | 000B |
| 11 | 0000 | 0000 | 000C |
| 12 | 0000 | 0000 | FFFF |
| ⋮ | | | |

Fig. 4C

| CLUSTER No. | | | |
|---|---|---|---|
| IMAGE DATA 1 | | | |
| 2 | PACKET 1 | PACKET 1 | PACKET 1 |
| 3 | | | |
| 4 | | | |
| 5 | PACKET 2 | | PACKET 2 |
| 6 | | ⌐ ⌐ 30 | |
| 7 | | | |
| 8 | PACKET 3 | PACKET 3 | PACKET 3 |
| 9 | | | |
| 10 | | | |
| 11 | | | PACKET 2 |
| 12 | | | |

Fig. 7

| | STATE | DIR/MAT | WRITE PROTECT | IMAGE REPRODUCTION | TO USE (PRIORITY) |
|---|---|---|---|---|---|
| 1 | EMPTY | DECLARATION FOR UNUSED | OFF | UNABLE | ABLE(1) |
| 2 | OCCUPIED | DECLARATION FOR ACTIVE | OFF | ABLE | ABLE(2) |
| 3 | OCCUPIED | DECLARATION FOR ACTIVE | ON | ABLE | UNABLE |
| 4 | UNKNOWN | UNUSED/USED (INCONSISTENT) | ON/OFF | UNABLE | ABLE(1) |

STORAGE MANAGEMENT SYSTEM FOR MEMORY CARD USING MEMORY ALLOCATION TABLE

This is a continuation of application Ser. No. 08/008,825 filed Jan. 25, 1993, which in turn, is a continuation of application Ser. No. 07/523,685 filed May 15, 1990.

BACKGROUND OF THE INVENTION

1. Field of the Invention

The present invention relates to a storage management system for a memory card, wherein data such as image data are stored in a memory card in the form of a file, for example.

DESCRIPTION OF THE RELATED ART

In the field of electronic still cameras, for example, a system for storing in a memory card data representative of an image captured together with management data representative of the order of storage and an indication of a storage area occupied is proposed by a co-pending Japanese patent application No. 120073/1987, filed in the name of the same assignee as the present application. The image data recording system thus proposed is capable of optionally erasing individual picture images and also capable of changing or rearranging the sequence of the picture images. In this system, however, the storage capacity of each storage area for storing image data is fixed. Consequently, it has been a defect of this system that the management of storage areas in terms of efficiently storing a plurality of picture images in different size is complicated.

Also, in the co-pending Japanese patent application No. 10997/1989 filed by the same assignee as that of the present application, there is proposed a memory management system capable of efficiently storing data in variable size. According to the prior art, in the memory management system, for a memory card having a storage area divided into a plurality of clusters, for managing the storage of information in every cluster, the relationship of ones of a plurality of clusters in which an image field of information is stored is indicated on a memory allocation table (MAT) and a cluster in which the beginning portion of the image field of information is stored is indicated on a directory.

In the prior art, the storage areas of the memory card are managed in two different kinds of storage management areas. Consequently, when such unusual operation as unloading of a memory card from a camera during recording operation is carried out, for example, a logical inconsistency may occur in the management information between the two kinds of management areas. This logical inconsistency may, when subsequently using the card, cause clusters to be permanently unusable for writing data in and reading data out of those clusters. In other words, when chained information between a MAT and a directory is broken for some reasons, clusters included in the chained information will not be usable thereafter.

Further, the term "memory card" used in this specification means not only a storage medium which has a semiconductor storage device supported by a card type base material and is detachably connected to other equipment but also a semiconductor storage medium which is detachably connected to other equipment, such as a memory cartridge and the like having a semiconductor storage device sealed in a mold package and detachably connected to other equipment.

SUMMARY OF THE INVENTION

It is, therefore, an object of the present invention to provide a storage management system for a memory card capable of efficiently using storage areas even if the memory card includes any storage units having logical inconsistency between storage management areas, in order to remove the problems in the prior art.

In accordance with the present invention, in a storage management system for a memory card having a storage area divided into a plurality of storage units that have a predetermined storage capacity and managing the storage of information in every storage unit, a MAT indicates the relationship of the storage units in which a group of mutually associated information is to be stored, and a directory indicates one of the storage units in which the beginning portion of a group of mutually associated information is to be stored. Either the MATs or the directories include an indication of whether or not the storage management system inhibits writing or erasing the information in each of the storage units associated with the MAT or the directory. Prior to writing information in the memory card, the storage management system searches the directory and, for one of the directories in use, traces the MATs associated with the directories in use to tabulate a storage unit table indicating whether each of the storage units designated by the MATs are empty or occupied.

Further, in accordance with the present invention, a storage management system for a memory card including a plurality of storage units each having a predetermined storage capacity and storing information comprises connecting means for interconnecting a memory card, MAT tabulating means for tabulating in a memory card a MAT indicating the relationship of the plurality of storage units, in which a group of mutually associated information is stored, a directory indicating one of a plurality of storage units, in which the beginning portion of the group of mutually associated information is stored, controlling means for controlling the MAT tabulating means and the directory forming means to store information in each of the plurality of the storage units, and a storage unit table indicating whether each of a plurality of the storage units designated by the MATs are empty or occupied. Either the MATs or the directories include an indication of whether or not the storage management system inhibits writing or erasing the information in one of the storage units associated with the MAT or the directory. The controlling means, when a memory card is connected to the connecting means, searches the directories and traces the MATs associated with the directories in use to indicate on the storage unit table whether ones of the storage units designated by the MATs are empty or occupied.

BRIEF DESCRIPTION OF THE DRAWINGS

The objects and features of the present invention will become more apparent from the consideration of the following detailed description taken in conjunction with the accompanying drawings in which:

FIGS. 2–7 are explanatory figures useful for understanding a storage management system for a memory card of an embodiment of the present invention;

DESCRIPTION OF THE PREFERRED EMBODIMENTS

Referring to the accompanying drawings, further details of the embodiments of a storage management system for a memory card will be given hereunder.

Figure 1:
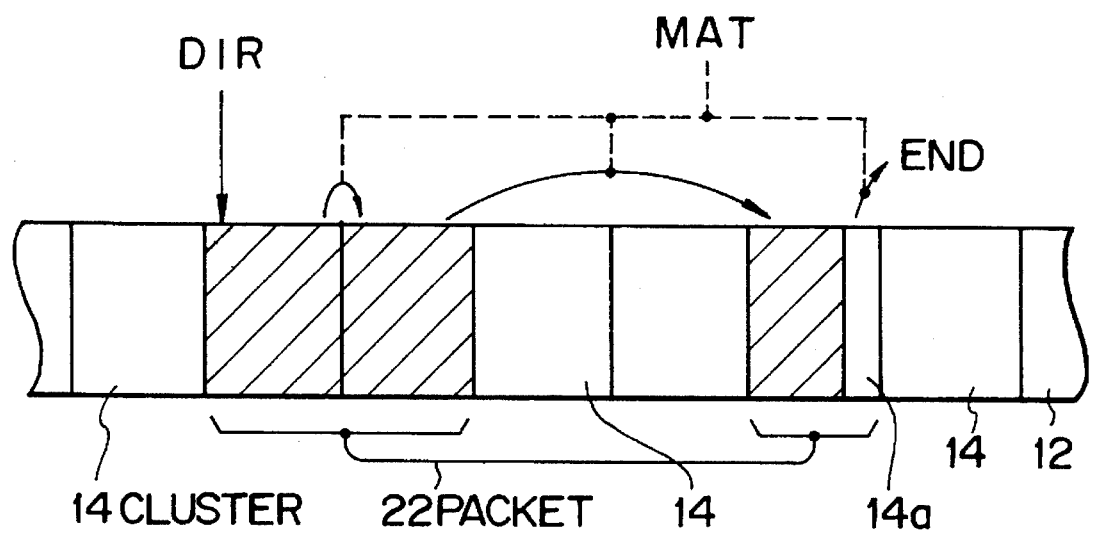
FIG. 1 illustrates a conception of a storage management system for a memory card of the present invention.

FIG. 1 conceptually shows an illustrative embodiment of a storage management system. As show in the figure, a memory card 10, FIG. 8B, has a storage area 12 split into clusters 14 having a predetermined storage capacity and employs memory allocation tables (MATs) 18 for the clusters 14 in addition to directories (DIRs) 16, FIG. 8B, for storing management data. The remainder of the storage area 12 in the illustrative embodiment is used as an image data area 20 in which image data is stored. The storage capacity of the cluster 14 may be optionally determined. For example, the capacity may be of a size enough to store a fraction of a positive integer for image data, which is necessary to represent a picture image in the form of a standard video signal format, and called "a packet."

In the illustrative embodiment, basically a single packet of image data 22 is stored in an optional cluster 14. Stored in a MAT area 18 are data, that is, MAT data, indicating the relationship of the clusters 14 which have stored the single packet of image data 22. The MAT data, in conjunction with the cluster 14 storing a part of the single packet of image data 22, includes identification information, such as numerical figures, pointing out another cluster in which stored is another part of the remainder of the image data 22, which is directly associated with the former part of the image data 22. When there is no remainder of the image data 22, the MAT data indicates with a predetermined code "ALL 1" (a binary value), for example, that represents that cluster 14 is the last one in the packet 22. Stored in the directory area 16 is identification information, such as a start cluster No. 24, FIG. 3, indicating the cluster 14 which has stored the first portion of the image data 22 by every image, that is, by every packet 22. Thereby, in which cluster 14 an image field of data has been stored is specified.

In an application of the memory card 10 having the storage capacity of 64M bits, 1024 clusters 14 having the capacity of 64K bits can be established. Each cluster 14 is given a number from 0 to 1023 in the sequence of physical arrangement. Stored in the cluster #0 are management data. The management data, in the illustrative embodiment as shown in FIG. 2, includes headers, packet information, directories, and MATs that are stored in the respective sub-areas. Stored in the remaining clusters #1~1023 are image data that also include header information particular to individual images.

A single packet 22 is stored in one or more clusters 14. Consequently, it can also be said that a packet is a logical area in which stored is image data representative of an image field. Given to the packets 22 are numerical figures in the practical sequence, for example, in the sequence of storing image data, etc. When a packet 22 is erased, the number given to that packet becomes a space, which will later on be allotted to new image data to be stored in that packet thereafter. A packet of the image data 22 is stored in a single cluster 14 or a plurality of clusters 14. In the last cluster 14, there sometimes happens to exist a space area 14a, FIG. 1. The number of the packets 22 that can be stored in the memory card 10 is equal to the number obtained by subtracting unity from the total number of the clusters 14 in the memory card 10.

Figure 3:
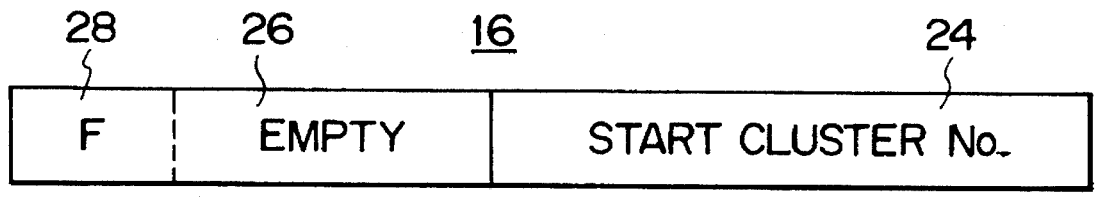

The illustrative embodiment of the present invention uses two bytes per packet 22 in the directory area 16 in which cluster No. 24 of the first cluster 14 by every packet 22 is stored. In the illustrative embodiment, as there are 1024 clusters, 10 bits used for the start cluster numbers and other bits are left unused as a space area 26 as shown in FIG. 3. Unused directory is indicated as "ALL 0." As shown in FIG. 3, the directory area 16 is provided with an indication of write protect 28. As the directory 16 can be established to be used also for a packet, write protect is also managed by every packet. In an application shown in FIG. 3, a practice of an indication of a hexadecimal "F" in a part of the space area 26, such as the most significant digital position 28, has realized inhibition of writing data in and erasing data of the cluster 14. In addition, the write protect indication may be provided in a specific position of the MAT 18.

In the MAT area 18, two bytes per cluster are used and the numbers for the clusters 14 associated therewith are stored therein. The value for the MAT 18 in the illustrative embodiment takes "ALL 0" in the case that the image data have not been stored in the cluster 14 of the MAT area 18, when the cluster 14 has been unused or erased, for example, and "ALL 1", that is, a hexadecimal "FFFF," in the case that the cluster 14 includes the end of the packet 22. Further, in the case that another cluster 14 follows with respect to the packet 22, the MAT area 18 uses a value indicating the number for the following cluster 14.

A packet information area out of the management data for the cluster #0 uses three bytes per packet 22, as shown in FIG. 2, to include one-byte data indicating the content of packet 22 and two-byte data indicating the number of the clusters 14 occupied by the packet 22. The packet information area is used in an initialization mode which is executed when the memory card 10 is loaded on an image data recording device, such as a digital electronic still camera 52, FIG. 8, which will be described later.

By the way, supposing that image data of packets #1, #2, and #3 for image data requiring a storage capacity for three clusters per image field having a standard picture quality are stored with the fist or top clusters #1, #4, and #7 thereof to be followed respectively. In this case, the directory 16 indicates the cluster numbers as shown in the most left column of FIG. 4A. The MATs 18, associated with the directories 16, as shown in the most left column of FIG. 4B, use values indicating the first cluster numbers in respective packets #1, #2, and #3 and the following cluster numbers. A state of the memory card 10 storing image data in an image data area 20 associated with the MAT 18 is shown in the most left column of FIG. 4C.

In the illustrative embodiment, when the packet #2 is erased, the first cluster number of the packet #2 in the directory 16 changes to "0", as shown in the second right column of FIG. 4A. Accordingly, in the MAT 18 the MAT data stored in the clusters #4, #5, and #6 are erased as shown in the center column of FIG. 4B. Further, image data stored in the clusters #4, #5, and #6, of the image data area 20 may remain without being actually erased, as shown with a dotted line 30 in the center column of FIG. 4C.

Then, a new packet #2 is stored. In this application, the new packet #2 includes image data having high picture quality and requires a storage capacity for six clusters. Therefore, in the directory 16, the first cluster number of the packet #2 changes to "4" again as shown in the most right column of FIG. 4A. Accordingly, in the MAT 18, as shown in the most right column of FIG. 4B, MAT data are prepared for six clusters of #4, #5, #6, #10, #11, and #12. Consequently, in this application, the image data of the packet #2 are stored in the clusters #4, #5, #6, #10, #11, and #12 of the image data area 20 in the form shown in the most right column of FIG. 4C. In the clusters #4, #5, and #6, new data are written over the old data.

Figure 8A:
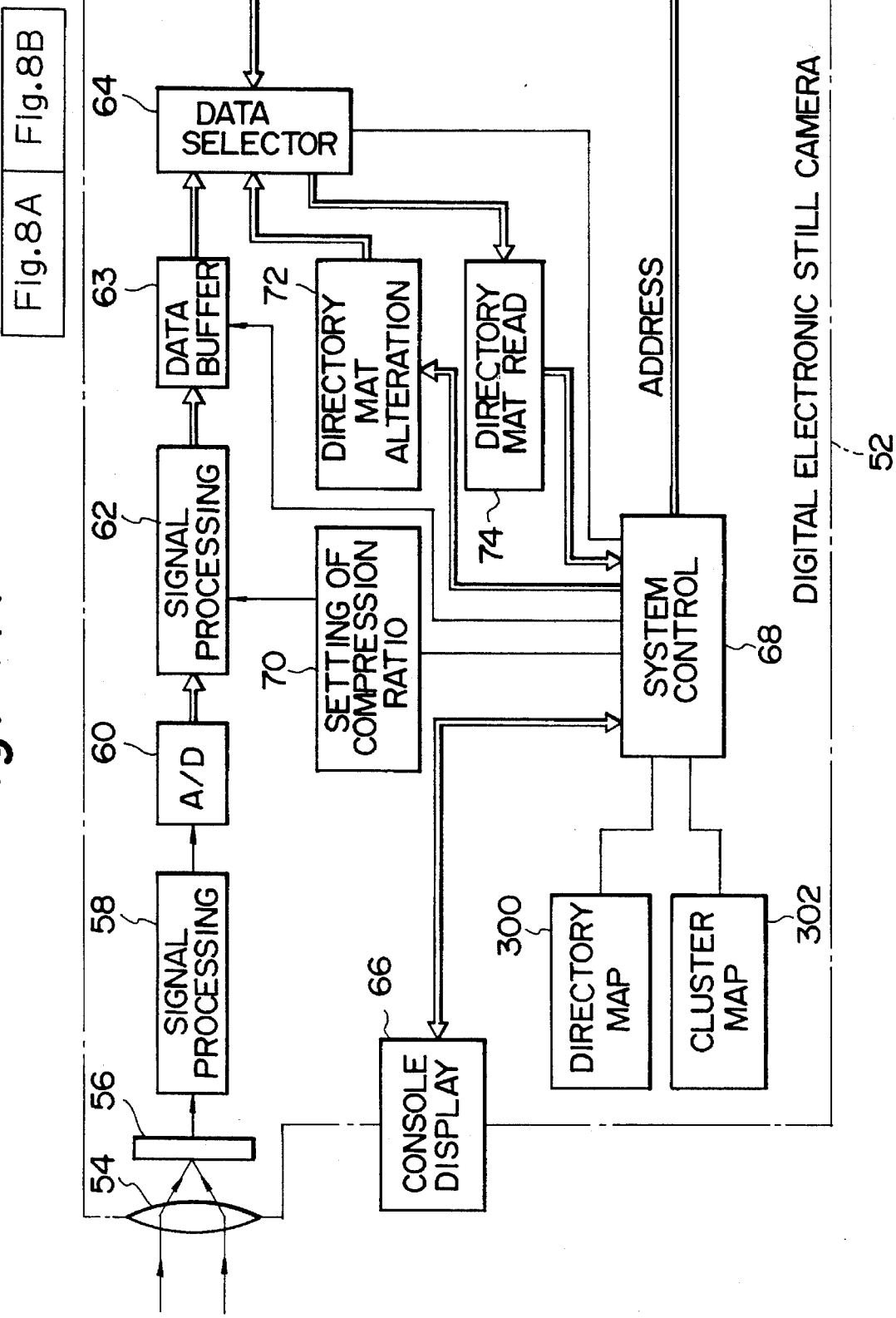
FIGS. 8A and 8B are, when combined as shown in FIG. 8, schematic block diagrams showing an application of the present invention to a digital electronic still camera.
Figure 8B:
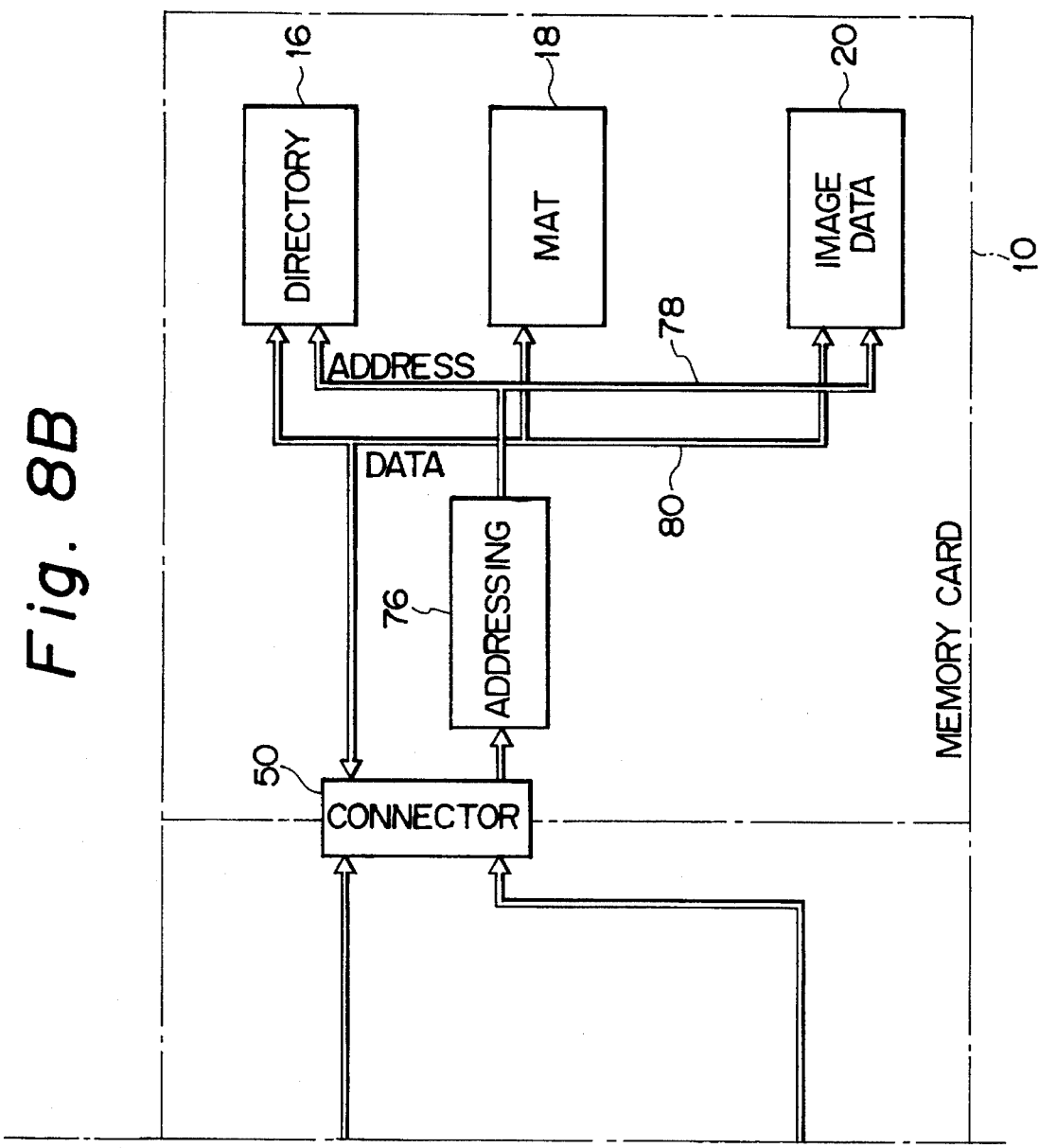

FIGS. 8A and 8B show an illustrative embodiment wherein such a storage management system as mentioned above is applied to a digital electronic still camera. In the illustrative embodiment, the storage management system comprises a digital electronic still camera 52 being detachably connected to a memory cartridge 10 through a connector 50. The camera 52 is a still picture photographing device which photographs a field by an image picking-up device 56 through an optical lens system 54 to store the image data representative of the field in a memory card 10. The picking-up device 56 produces an output, which is in turn subject to signal processing, such as color correction in a signal processing circuit 50, and converted into the corresponding digital data through an analog/digital (A/D) conversion circuit 60. Those digital data are processed with color separation and compression coding in a signal processing circuit 62 and ten transmitted to the connector 50 through a data selector 64.

The camera 52 has a console and display 66, which receives various manual instructions such as exposure, data compression mode and write protect designations, and also indicates the state of the system to the user, such as alarm indicative to the state in which an idle cluster is not available for storing a record of image data. The console and display 66 transmits data representing the designation fed therein to a system control 68. The information on the state of the camera 52 is fed to the console and display 66 from the system control 68.

Figure 5:
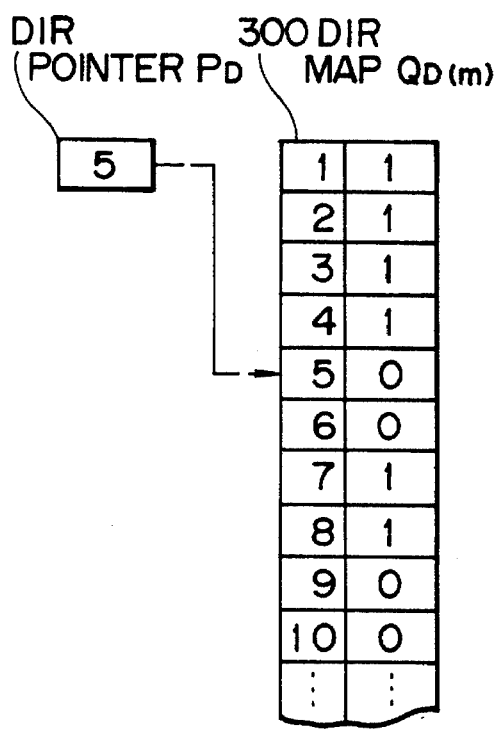
Figure 6:
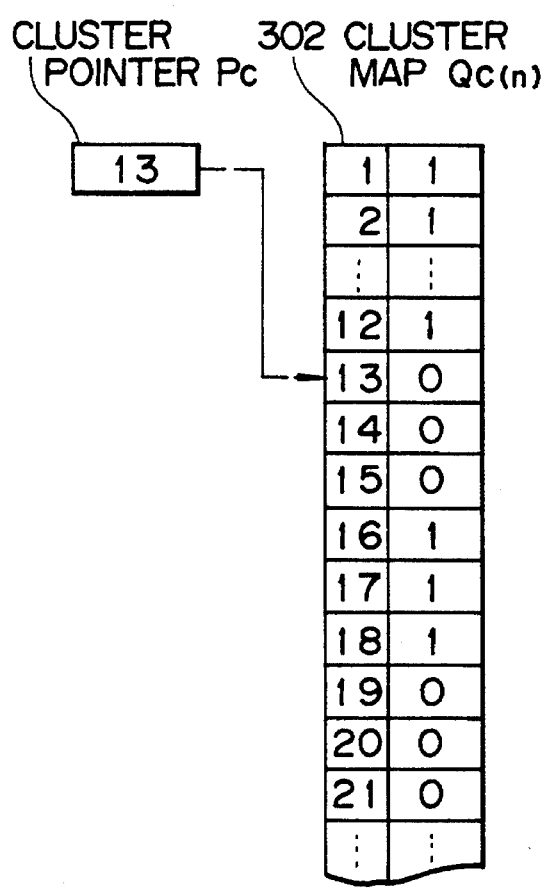

The system control 68 is a control unit which not only controls the entire operations of the camera 52 but also writes data in the memory card 10. The system control 68 uses a storage area a part of which is provided with a directory map 300 and a cluster map 302 in the illustrative embodiment of the present invention. The directory map 300, as shown in FIG. 5, is an indication table indicating an empty state or an occupied state of the individual directories 16 in the memory card 10 connected to the camera 52. In the figure, "1" indicates the state of the directories 16 being occupied, while "0" indicates the state of the directories being empty. In the system control 68 a directory pointer PD indicates a directory number at which searching the directories 16 currently empty is started. Similarly, the cluster map 302, as shown in FIG. 6, is an indication table indicating an empty state or an occupied state of the individual clusters 14 connected to the memory card 10. A cluster pointer PC indicates a cluster number at which searching is commenced with the clusters 14 being currently empty. The directory map 300 may not be necessarily provided, since data can be read directly out of the memory card 10.

Connected to the system control 68 is a compression ratio setting circuit 70 which is a circuit for setting a compression ratio of codes for image data in a signal processing circuit 62 according to a data compress mode indicated by the console and display 66 under the control of the system control 68. As the compression coding method, an orthogonal transform such as a two-dimensional cosine transform, or the sub-sampling, and the quantization are advantageously applicable.

The data selector 64 is a selector circuit which sends out image data from the signal processing circuit 62 and control data involved in the system control 68 selectively through the connector 50 to the memory card 10. Connected to the data selector 64 are a directory/MAT alteration circuit 72 and a directory/MAT read-out circuit 74. The directory /MAT alteration circuit 72 is a circuit which generates data to be written in the directory 16 and the MAT 18 of the memory card 10. The directory/MAT read-out circuit 74 reads out of the directory 16 and the MAT 18 of the memory card 10 packet numbers for image data stored in the memory card 10 and cluster numbers associated with the packet numbers and then feeds the packet numbers and the cluster numbers to the system control circuit 68.

The memory card 10 has an addressing circuit 76 to which an address specifying a storage location in the memory card is given form the system control 68 through the connector 50. The memory card 10 has an address but 78 and a data bus 80 for storage areas 16, 18, and 20. The former is connected to the addressing circuit 76 and the latter to the connector 50.

In the meantime, the state of the data area 20 storing image data is generally classified into four conditions as illustrated in FIG. 7. Whether the data storage area 20 is empty or occupied is indicated on the directory 16 in the case of the illustrative embodiment of the present invention. It is a matter of course that it may be indicated on the MAT 18. Whether or not data can be newly written in the data storage 20 is generally determined according to a write protect indicator 28. In a processing system, such as a personal computer, it is reasonable to follow the write protect indicator 28. Further, in a conventional camera, when the write protect indicator 28 indicates "OFF" for the data storage area 20, although the directory 16 indicates "Active" for the data storage area 20, as shown in a state 2 of FIG. 7, it is often desirable for a user to store data in the data storage area 20 again. Therefore, it is sometimes desirable to treat the data storage area in the similar manner as an area indicated as "ON" by the write protect indicator 28, while according to the illustrative embodiment, a sub-table QD'(m) for searching the area is provided for two-stepped searching.

A state 4 in FIG. 7 shows that whether the directory 16 or the MAT 18 is empty or occupied is unknown, in other words, that the logic is inconsistent. This state is resultant from the card 10 disconnected form the connector 50 during operation of the camera 52. The state includes incoincidence of data between the directory 16 and the MAT 18 and inconsistency of control data between two MATs 18. More specifically, included in the state are a case that the number of clusters indicated in a packet information area, FIG. 2, does not coincide with the number of chains of the MAT 18 and a case that the chaining of the MAT 18 is broken in the middle, that is, the MAT 18 indicates an unreasonable cluster number.

To avoid such inconsistent states as stated above, according to the illustrative embodiment of the present invention, when the camera 52 is loaded with the memory card 10, the system control 68 checks the logical consistency between the directory 16 and the MAT 18 to enable efficient use of the memory card 10 even if the logical inconsistency should exist in the control data between the directory 16 and the MAT 18. This is because when the memory card 10 is brought into connection with the camera 52 through the connector 50, the system control 68 executes an initialization mode in which the cluster map 302 is prepared. In the initialization mode, the system control 68 searches all the directories 16, and traces the MATs 18 specified by the directories 16 having an indication "1" indicating the state of being occupied on the location corresponding to the cluster map 302. In this way, the cluster map 302, as shown in FIG. 6, is formed, for example.

When the cluster map 302 is formed, the following processing can be executed in the memory card 10.
(1) When recording image data in the memory card 10, it is possible to search empty clusters, making reference to the cluster map 302.
(2) After comparing the cluster map 302 with the MAT 18, it is possible to reset a MAT which cannot obtain the logical consistency between the cluster map 302 and the MAT 18, that is, forcibly enable the MAT to be available.
(3) By comparing the cluster map 302 with the MAT 18, it is possible to give a user an indication or an alarm for a MAT which cannot obtain the logical consistency between the cluster map 302 and the MAT 18.

The memory card 10, once the cluster map 302 is formed in an initialization mode, may not necessarily be structured to update the data every time of recording operation. Also, the memory card 10 may be structured to erase the cluster map 302 after executing the above step (2) or (3), and search an empty cluster 14 by directly reading the MAT 18 when writing image data in the memory card 10.

The memory card 10 may be provided with a plurality of the cluster maps 302, for example, to indicate in the first cluster map whether or not each cluster 14 is empty or occupied and in the second cluster map whether or not the write protect for each cluster is ON or OFF. If so structured, at the time of recording data in the cluster 14 the memory card 10 can first refer to the first cluster map to record image data in empty clusters, and after using up all the empty clusters the memory card 10, as the second step, can refer to the second cluster map to record image data in empty clusters having an OFF indication indicated by the write protect indicator 28, that is, clusters which have been already recorded with image data but have not yet been write-protected.

Figure 9A:
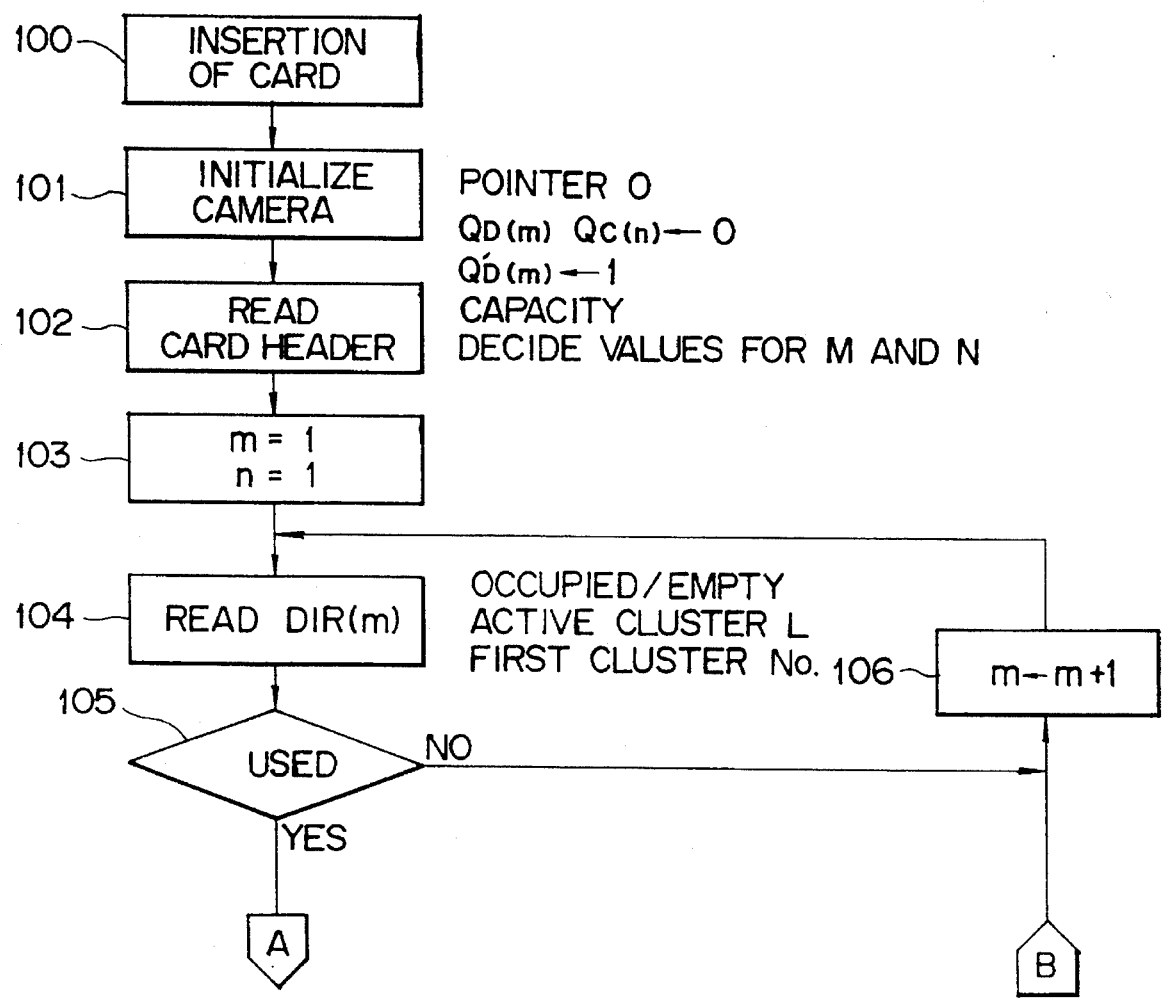
FIGS. 9A, 9B, and 9C are flow charts showing operational procedure of a memory card in an initialized mode set at the time of loading the memory card on the digital electronic still camera shown in FIGS. 8A and 8B.
Figure 9B:
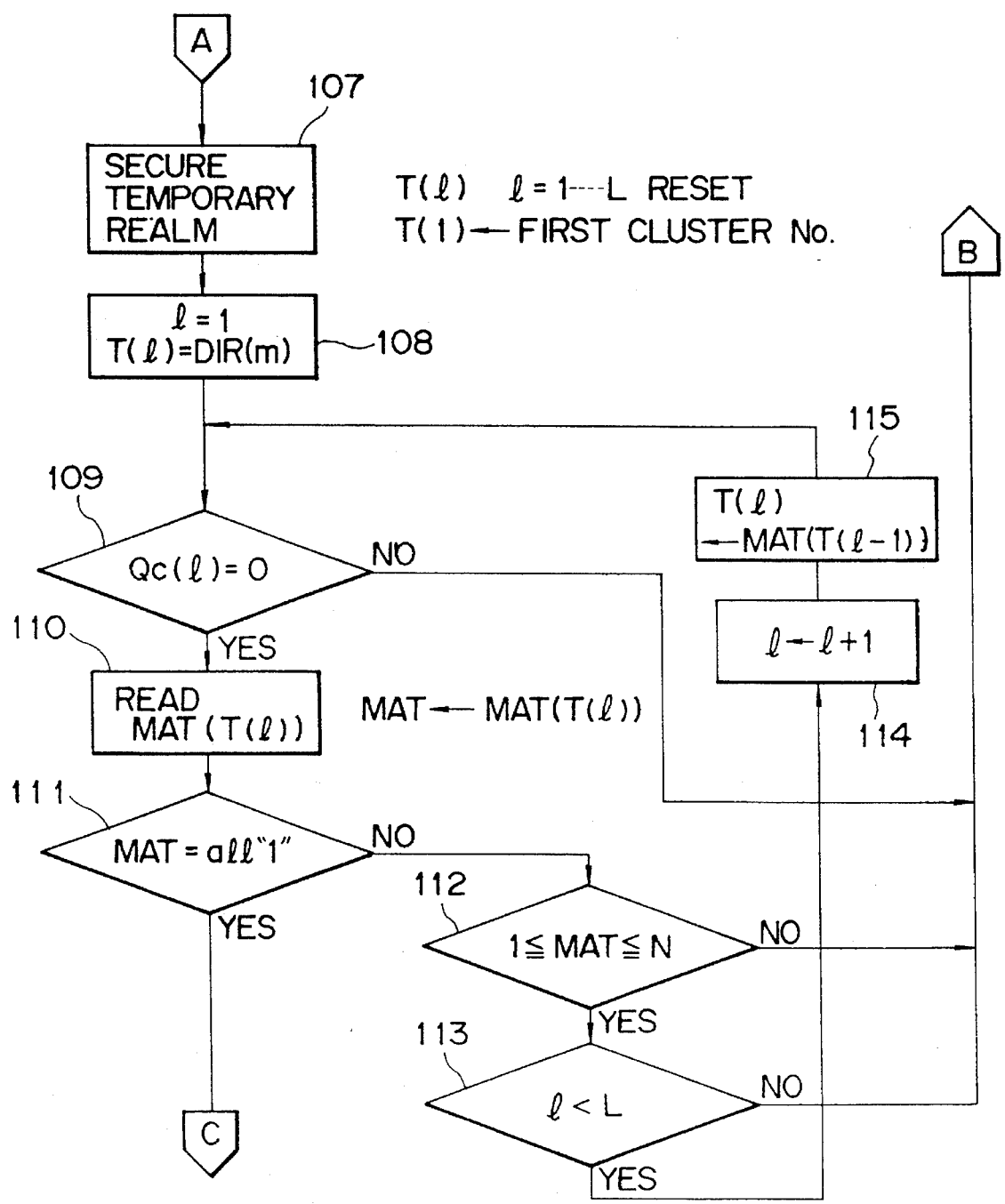
Figure 9C:
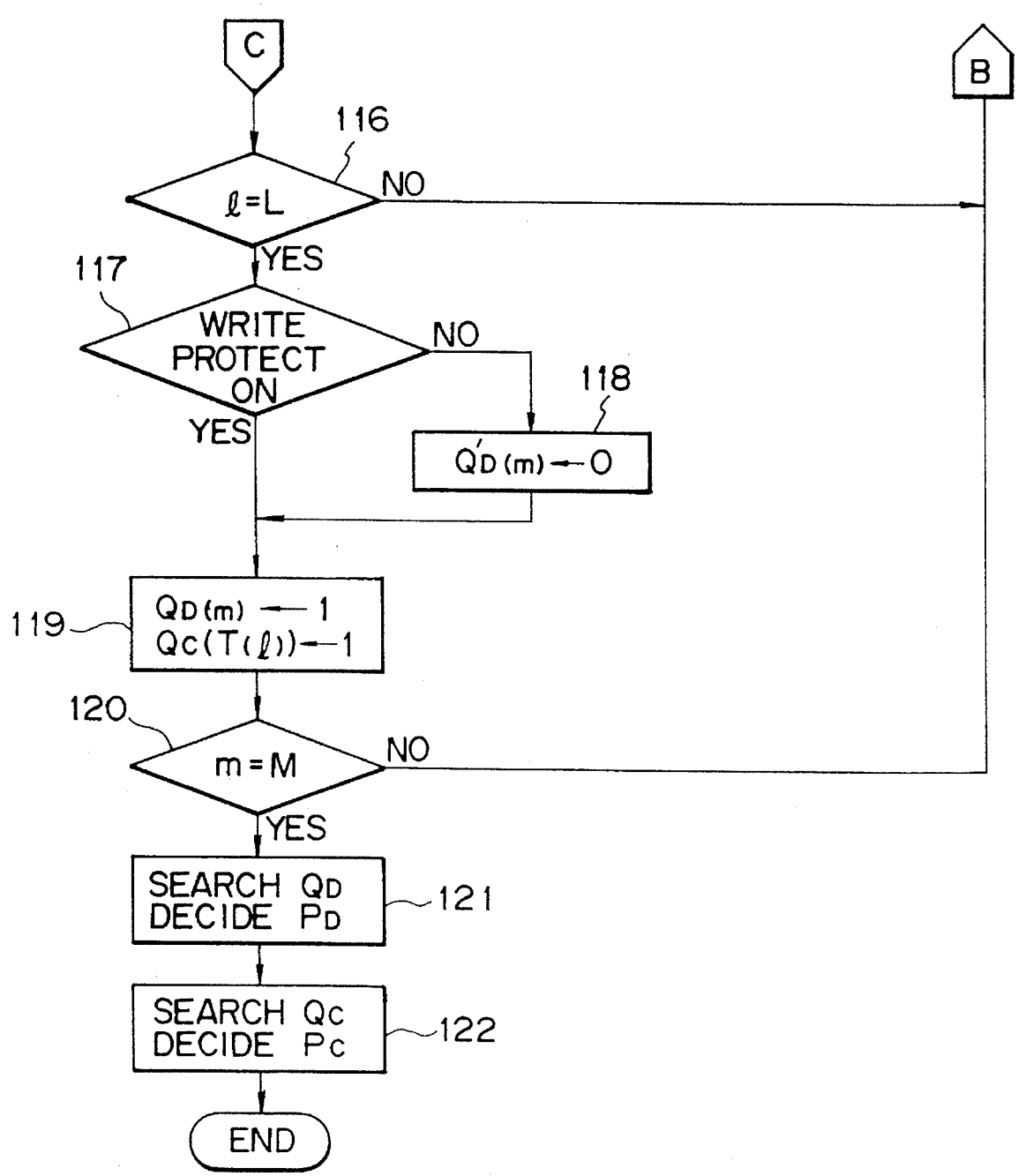

In the digital electronic still camera 52, a storage management system for the memory card 10 as stated above is effectuated in an initialization mode as shown in FIGS. 9A, 9B, and 9C. Firstly, referring to FIG. 9A, the memory card 10 is loaded on the camera 52 through the connector 50 (step 100). In response to the inserted card 10, the system control 68 carries out initialization for setting pointers PD and PD to "0" and maps QD(m) and QC(n) to "0", respectively. A variable m, however, uses natural numbers from 1 to M out of the numbers of the individual directories 16, while a variable n uses natural numbers from 1 to N out of the numbers of the individual clusters 14. Then, a sub-directory map QD'(m) is prepared and set to "1." The sub-directory map QD'(m) indicates that the corresponding directory #m has already been recorded and also indicates "0" when the write protect indicates OFF or "1" for other occasions.

The system control 68 reads a header and packet information (FIG. 2) out of the memory card 10 (step 102) to determine a capacity for the storage area of the memory card 10 and values for M and N. Subsequently, the system control 68 sets the variables m and n to "1" step 103 to read a symbolic number m when counting from the directory 16 of the memory card 10, that is, the directory DIR(m) of #1 in this case step 104. Judging from those data, the system control 68 can find whether the directory is empty or occupied, the number L of the clusters to be used, and the first cluster number. After finding that the directory has not been used step 105, the system control 68 increments the variable m (106) and repeats the steps 104 and 105. On the other hand, when the directory has been used, the system control 68 secures a temporary realm T(l) in the storage area of the directory step 107. A variable l uses natural numbers from 1 to L and first uses "1" to set the directory DIR (m) in the temporary realm T(l) step 108. Subsequently, the system control 68 searches the content of a symbolic number l, that is, the first cluster map QC(l) in this case. The content of the first cluster map QC(l) uses values, as shown in FIG. 6, for example. When the content of the cluster map QC(l) is "1" step 109, a map for the cluster has already been formed, in other words, it is indicated that the cluster is in use, that is, the cluster has already been recorded with data. Therefore, the system control 68 increments the variable m step 106 and returns to the step 104.

In the step 109, when the content of the cluster map QC(l) is "0," the system control 68 then reads a MAT 18 specified by the temporary realm T(l) step 110 and checks whether or not the content is ALL 1, that is, step 111. When the MAT 18 is not "ALL 1,~ it means that the corresponding cluster 14 is not the last cluster of the associated packet, but the value is the relevant number of the cluster 14. When the system control 68 checks a value of the MAT (step 112) and finds that the MAT uses either one of values from 1 to N, the system control 68 increments l (step 114) as far as the variable l is smaller than L, further sets the MAT value so far, MAT(T(l-1)), in the temporary realm T(l) (step 115), and then returns to the step 109. When the variable l is not smaller than L, the system control 68 proceeds to the step 106 for incrementing the variable m.

When the MAT 18 indicates "ALL 1" in the step 111, the corresponding cluster 14 is the last cluster of the associated packet. Consequently, the system control 68 proceeds to the step 116, and when the variable l coincides with the last value L, the system control 68 regards the packet as being occupied and checks the write protect indicator 28 of the directory 16 (step 117). When the write protect indicator 28 is OFF, the system control 68 sets the sub-directory map QD'(m) to "0" (step 118). When the write protect indicator is ON, the system control 68 sets QD'(m) to "1" to proceed to the step 119. In the step 119, the system control 68 sets "1" for both directory map QD(m) and cluster map QC(T(l)). To set "1" for both maps stated above means that the directories and the clusters have been registered in both maps QD and QC. Further, in accordance with the illustrative embodiment of the present invention, when a cluster 14 is used duplicatedly in the same packet 22 and even when the number of clusters exceeds the number specified in the directory, tracing of the chaining of the MAT is not terminated. Therefore, in this case, the packet is treated as one being inexistent. In addition, the storage management system of the present invention is not concerned with duplicate use of a cluster in different packets.

The storage management system of the present invention repeats the above-mentioned activities of forming the maps QD and QC for all the remaining directories from #2 to #M in the memory card 10 (step 120). FIG. 5 and FIG. 6 show illustrative embodiments of the directory map 300 and the cluster map 302 formed in this way.

When the maps 300 and 302 are formed, the system control 68 searches them to initialize a directory pointer PD and a cluster pointer PC for immediate use (steps 121, 122). Specifically, the system control 68 sets the pointers PD and PC so as to point out directories and clusters indicated with the lowest number "0" in the maps 300 and 302.

Figure 10:
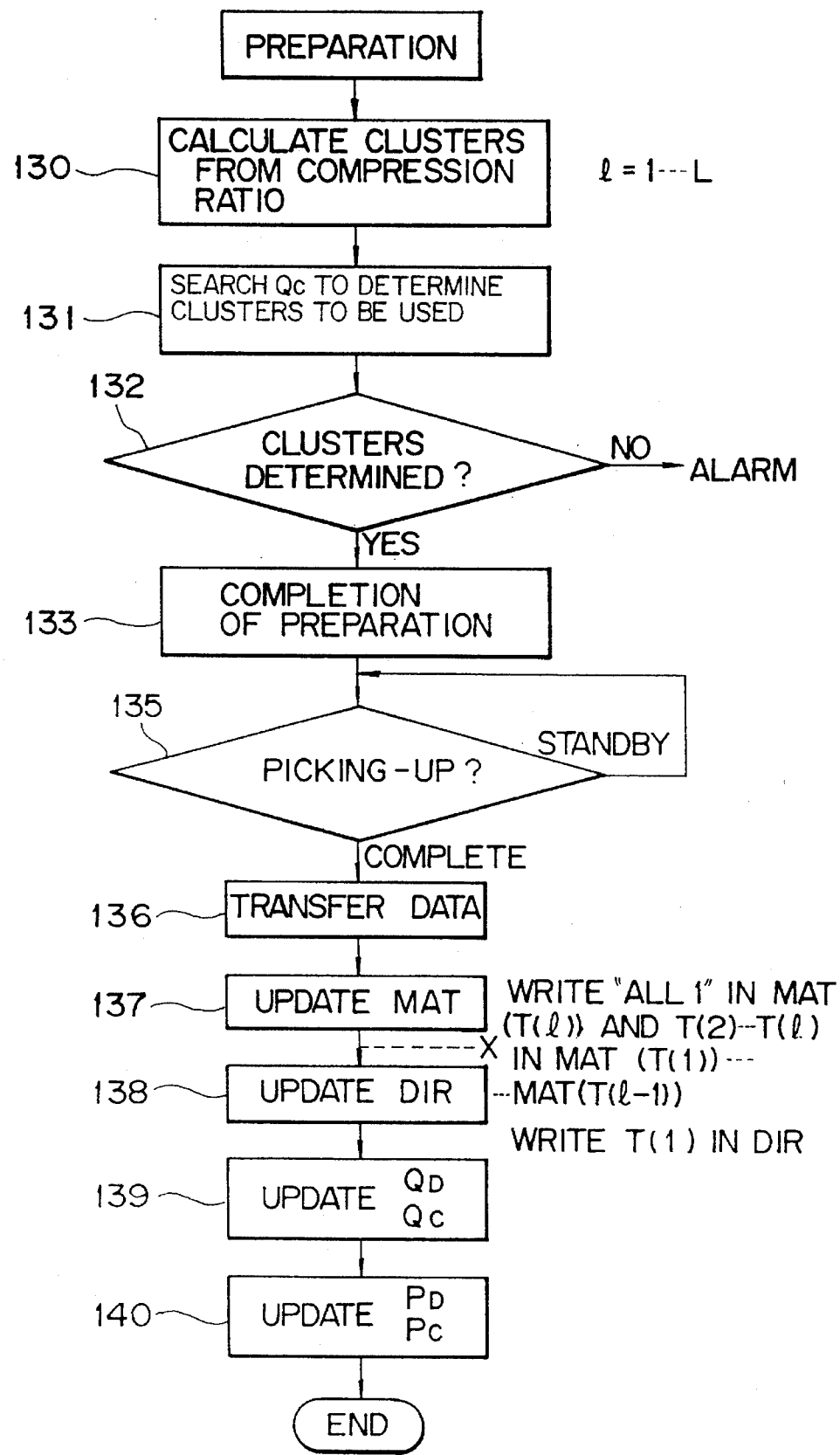
FIGS. 10, 11A, and 11B are flow charts illustrating operational procedure of the memory management system at the time of photographing with the digital electronic still camera shown in FIGS. 8A and 8B.

In the case that image data are stored in the memory card 10 using the camera 52, the storage management is executed according to an illustration shown in FIG. 10. When a compress mode for image data as preparation for photographing is set by the console and display 66, the system control 678 sets a compression ratio for the signal processing circuit 62 in a compression ratio setting circuit 70 (step 130). The system control 68 calculates the number of clusters 14 necessary to be stored in the image data storage area 20 of the memory card 10 based on the volume of data after compression (step 131) and then searches the cluster map QC to determined clusters 14 to be used (step 132). Further details will be elucidated thereafter. When there is any empty cluster in the cluster map QC (step 132), the system control 68 completes preparation (133), but when there is no empty cluster, the system control 68 dispatched to an user an alarm to that effect.

When a photographing instruction is fed to the system control 68 by operating the console and display 66 (step 135), the system control 68 runs the imaging device 56 to photograph a field, while the output image data for the image sensor 56 stored in a data buffer 63 after processed for color correction in the signal processing circuit 58, converted into the corresponding digital data in the A/D conversion circuit 60, and further compressed in the signal processing circuit 62 at a compression ratio set in the compression ratio setting circuit 70. Simultaneously, the system control 68 generates an address for the image data storage area 20 according to a specified number for the cluster 14 in the step 131. Those data and the address are fed in the memory card 10 through the connector 50.

In the memory card 10, the system control 68 writes image data in the image data storage area 20 according to a specified address (Step 136). Subsequently, the system control 68 updates the MAT to write the temporary realm T(2)–T(l) in the Mat (T(1))–MAT(T(l)) (step 137). In such a state, for example, when the memory card 10 is unloaded form the camera 52 at the point marked with an X as illustrated in FIG. 10, inconsistency may occur in the contents between the MAT 18 and the directory 16. In accordance with the illustrative embodiment of the present invention, preparation of the cluster map 302 at the time of loading the card 10 on the camera 52 makes it possible to remove even the state of the above-mentioned logical inconsistency.

Then, the system control 68 updates the directory DIR to write T(1) in the directory DIR (step 138). Subsequently, the system control 68 updates both maps QD and QC step (step 139) and both pointers PD and PC (step 104), respectively, to terminate the recording operation. In addition, it is not necessary to update both of maps and pointers, while it is sufficient to carry out either the step 139 or the step 140.

Figure 11A:
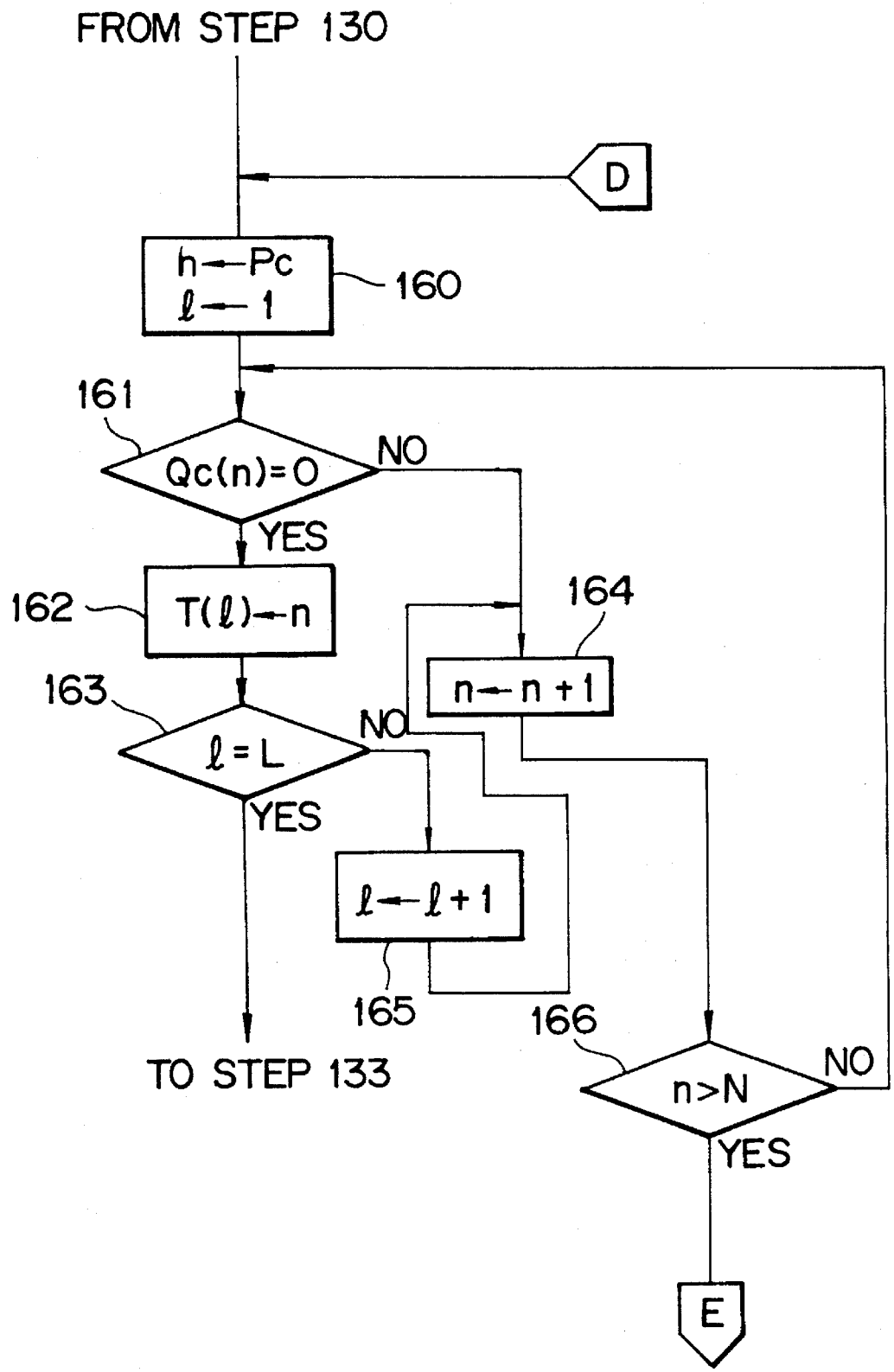

Here, a further detailed description will be given for the steps 131 and 132 for searching the cluster map QC to determine a usable empty cluster 14, making reference to FIGS. 11A and 11B. Referring to FIG. 11A, after the completion of the step 130, the system control 68 first sets a value for the pointer PC at the end of the step 130 to the variable n and "1" to the variable l (step 160). When the cluster map QC(n) at that time is "0" (step 161), the system control 68 sets a value for the variable n at that time in the temporary realm (step 162). Then, the system control 68 increments the variable l (step 165) and also increments the variable n (step 164) to return to the step 161. This operation is continued until the variable n becomes exceeds to the final value N (step 166). In this way, the system control 68 searches unrecorded clusters 14. When the variable l becomes equal to the final value L in the step 163, preparation terminates (step 133, FIG. 10).

Figure 11B:
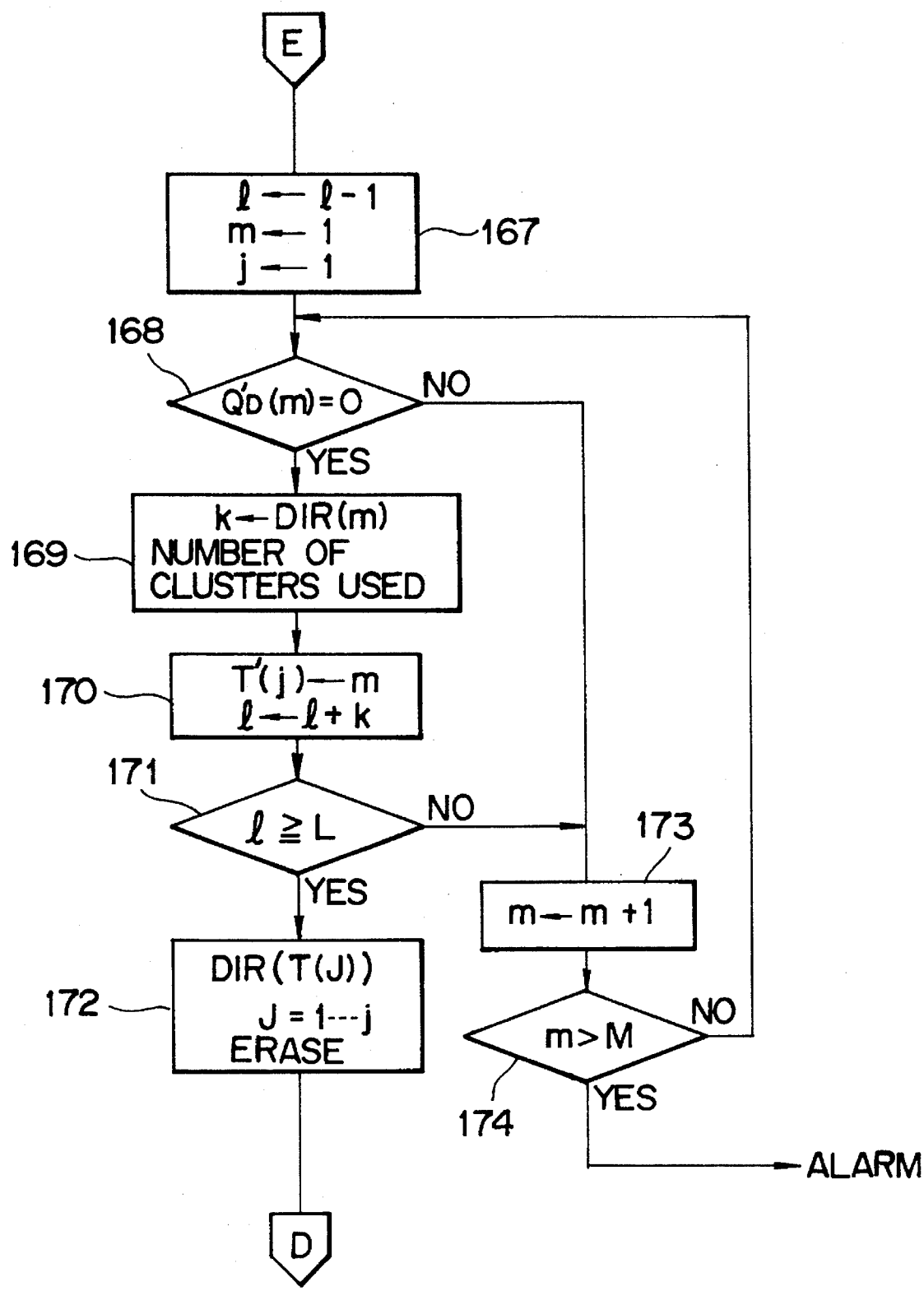

When the variable n exceeds the final value N in the step 166, the system control 68 proceeds to the step 167 as shown in FIG. 11B to decrement the variable l as well as set the variables m and j to "1", respectively. Then, system control 68 searches the variable m indicating "0" for the submap area QD'(m) at that time (step 168, 173, 174). When the submap area QD'(m) having a value "0" is found, the system control 68 sets not only the number of cluster used in the directory DIR(m) for the value m as a variable k (step 169) but also the value m at that time in the temporary realm T'(j) and adds the value k to the variable l (step 170). In this way, the system control 68 repeats the loops 168–171, 173, and 174 while incrementing the variable m, until the variable l reaches the final value L.

When the variable l reaches the final value L, the system control 68 proceeds to the step 172 to erase an image packet relevant to the directory DIR (T(J)) and returns to the step 160 shown in FIG. 11A. In this case, the variable J uses positive integers from 1 to j. The loops 168–171, 173, and 174 are cyclically repeated until the variable m reaches the final value M. The fact that the variable m reaches the value M in the loop (174) means that there are no empty clusters available. Consequently, the system control 68 sends an alarm to the console and display 66. In this way, preparation is made for the cluster 14 in which data have already been recorded and the write protect indicator 28 indicates OFF therefor.

Figure 12:
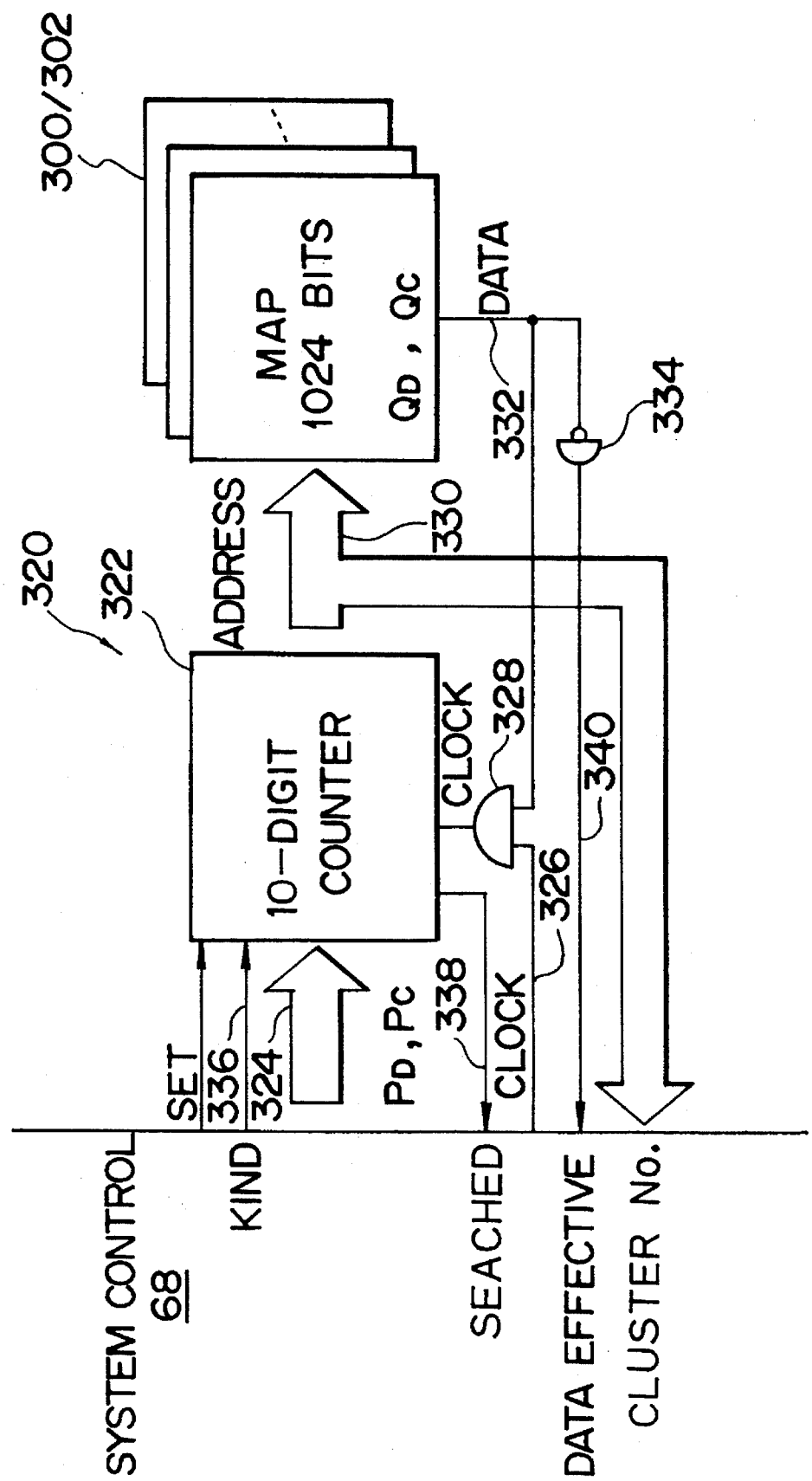
FIG. 12 is a functional block diagram illustrating a hardware circuit which searches empty clusters in the memory management system of the illustrative embodiment and is implemented in hardware.

The steps 131 and 132 for searching empty clusters or directories shown in FIG. 10 can also be implemented as hardware in a search circuit 320 exemplified in FIG. 12. According to the hardware circuit 320, empty clusters 14 or directories 16 can be searched at higher speed. The search circuit 320 is connected to the system control 68 and has a 10-digit counter 322 in the illustrative embodiment of the present invention. The counter 322 is a digital counter shifting in response to a search clock which receives initial values for the pointers PD and PC from the system control 68 through a connection line 324 and form a connection line 326 on an OR gate 328. The counter 322 has an output 330 which not only functions as an addressing line for the maps 300 and 302 but also conveys data indicative of the number of a cluster or a directory that the system control 68 currently searches. A data output 332 for the maps 300 and 302 not only controls a clock stepping up the counter 322 through the OR gate 328 but is fed to the system control 68 through an inverter 334 as significant data, that is, data 300 for indicating emptiness of clusters or directories.

The cluster map 302 is provided with a storage area according to a type of the memory card 10 connectable to the camera 52. An instruction of which storage area to select, one for the map 300 or one for the map 302, is fed from the system control 68 to the counter 322 over a connection line 336. A timing at which values for the pointers PD and PC and sorts of the maps 300 and 302 are entered to be set in the counter 322 is fed from the system control 68 on a control line SET. When the counter 322 reaches its final digital value, a signal for indicating count-up is generated in an output 338, thereby the system control 68 detects the termination of search.

The system control 68 sets initial values for the pointers PD and PC in the counter 322, and supplies a search clock to the counter 322 to step up the counter. Thereby, each storage location is in turn addressed and as a result, the content, that is, data 340 indicating emptiness or occupancy is read by the system control 68. An address for the map 300 or the map 302 is, as it is, transmitted to the system control 68 to be used as the number for a cluster or a directory, thereby the system control 68 can detect emptiness or occupancy of each cluster or directory.

The illustrative embodiment of the present invention which prepares the maps 300 and 302 and has the search circuit in hardware is advantageously used in respect of less time required for searching than that required for searching empty clusters, making reference directly to the MAT 18. Regarding the time required for searching, a search through a software (FIG. 10) takes more time than that required for the illustrative embodiment of the present invention, and much more time is required for a searching method of erasing the cluster map 302 to directly refer to the MAT 18 even after the cluster map 302 has been prepared using and a searching method previously explained in the prior art.

The memory card 10 in which image data has been stored in this way can be played back by a reproducer in the following procedure. When the memory card 10 is connected to the reproducer or playback apparatus to address an image field to be reproduced, the reproducer reads the directory 16 and the MAT 18 out of the memory card 10 to generate an address for a cluster in which data of an image field to be reproduced is stored and then reads the image data out of the image data storage area 20. The compressed code of the image data thus read is expanded, converted into a format for a television signal, and reproduced to be a visible image on a monitor.

In the present invention stated above, when a memory card having data, such as image data, stored in every storage unit is used, a state of each storage unit being currently used is investigated to prepare a table, and based on the table the storage management is executed. Consequently, even when a mishandling, such as pulling a memory card out of a recorder unit during operation, which causes logical inconsistency between the directory and the MAT, the effect is confined to the specific storage unit being in use for writing. As a result, problems on manipulation of a card, including an occurrence of permanently unusable storage units seen in the prior art, can be removed to improve reliability.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A storage management method for managing the storage of information in a camera system memory card performed by a storage management system containing said memory card, the memory card having a storage area divided into a plurality of storage units each having a predetermined storage capacity, one of the storage units including a memory allocation table and a directory, where the storage card may contain information previously stored in a storage area, that storage being considered in use, said method managing storage of information in each of the plurality of storage units, said method comprising the steps of:

storing, in the memory allocation table, values identifying storage units arranged in groups of storage units containing related information;

storing, in the directory, values identifying a first storage unit in each of said groups of storage units;

prior to writing information in the memory card, reading each location in said directory;

determining whether each read directory location corresponds to a first storage unit of a group of storage units that are in use;

tracing each location in the memory allocation table which is associated with groups of storage units identified in said determining step as being in use;

forming a storage unit table indicating whether the storage units corresponding to traced locations in the memory allocation table are empty or occupied;

comparing said storage unit table with said memory allocation table, and resetting each location in the memory allocation table which lacks coincidence between said storage unit table and said memory allocation table;

writing information to the memory card based on information in one of said memory allocation table and said storage unit table;

identifying, prior to said writing step, one or more of the plurality of storage units which are empty and not write inhibited, wherein said writing step the information is written to at least one of the identified storage units being empty and not write inhibited;

identifying, if none of the plurality of storage units are empty and not write inhibited, one or more of the plurality of storage units which are occupied and not write inhibited, wherein said writing step the information is written to at least one of the identified storage units being occupied and not write inhibited; and prohibiting writing to a storage unit which is indicated as being write inhibited.

2. An information storage management apparatus for storing information in a camera system memory card having a storage area divided into a plurality of storage units that have a predetermined storage capacity, said apparatus comprising:

card connector means for connecting said memory card to said apparatus;

table forming means for forming, in said memory card, a memory allocation table containing values identifying storage units arranged in groups of storage units containing related information;

directory forming means for forming, in said memory card, a directory containing values identifying a first storage unit in each of said groups of storage units containing related information;

control means for controlling said table forming means and said directory forming means to store information in each of the plurality of storage units; and a storage unit table for indicating whether storage units identified in the memory allocation table are empty or occupied;

said control means reading each location in said directory and determining whether a read directory location corresponds to a first storage unit that is occupied;

said control means tracing each location in said memory allocation table which is associated with said first storage unit that is occupied, and storing a value in said storage unit table indicating whether the storage units designated by traced locations in the memory allocation table are occupied, and effectively resetting each location in the memory allocation table which lacks coincidence with the corresponding directory location by indicating as empty in the storage unit table those storage locations not traced; and said control means writing information in the memory card based on information in said storage unit table, and prior to writing information in the memory card, identifies one or more of the plurality of storage units which are empty and not write inhibited and writes the information to at least one of the identified storage units being empty and not write inhibited, and if none of the plurality of storage units are empty and not write inhibited identifies one or more of the plurality of storage units which are occupied and not write inhibited and writes the information to lest one of the identified storage units being occupied and not write inhibited, and prohibits writing to a storage unit being write inhibited.

3. A storage management method, according to claim 1, further comprising the step of:

determining, prior to writing information to a particular storage unit, whether or not said particular storage unit is inhibited from being written and erased based on information in one of the memory allocation table, the directory and the storage unit table; and writing the information to the storage unit if the storage unit is determined not to be inhibited form being written or erased.

4. A storage management apparatus, according to claim 2, further comprising means for determining, prior to writing information to a particular storage unit, whether or not said storage unit is inhibited from being written and erased based on one of said memory allocation table, said directory and said storage unit table; and allowing said control means to write the information if the storage unit is occupied and is determined not to be inhibited form being written or erased.

5. A storage management method for managing the storage of information in a camera system memory card performed by a storage management system containing said memory card, the memory card having a storage area divided into a plurality of storage units each having a predetermined storage capacity, one of the storage units including a memory allocation table and a directory, where the storage card may contain information previously stored in a storage area, that storage being considered occupied, said method managing storage of information in each of the plurality of storage units, said method comprising the steps of:

storing, in the memory allocation table, values identifying storage units arranged in groups of storage units containing related information;

storing, in the directory, values identifying a first storage unit in each of said groups of storage units;

prior to writing information in the memory card, reading each location in said directory;

determining whether each read directory location corresponds to a first storage unit of a group of storage units that are occupied;

tracing each location in the memory allocation table which is associated with groups of storage units identified in said determining step as being occupied;

forming a storage unit table indicating whether the storage units corresponding to traced locations in the memory allocation table are occupied and effectively identifying each location in the memory allocation table which lacks coincidence with the corresponding directory location by indicating as empty in the storage unit table those storage locations not traced;

writing information to the memory card based on information in one of said memory allocation table and said storage unit table; identifying, prior to said writing step, one or more of the plurality of storage units which are empty and not write inhibited, wherein in said writing step the information is written to at least one of the identified storage units being empty and not write inhibited;

identifying, if none of the plurality of storage units are empty and not write inhibited, one or more of the plurality of storage units which are occupied and not write inhibited, wherein said writing step the information is written to at least one of the identified storage units being occupied and not write inhibited; and prohibiting writing to a storage unit which is indicated as being write inhibited.

6. An information storage management apparatus for storing information in a camera system memory card having a storage area divided into a plurality of storage units that have a predetermined storage capacity, said apparatus comprising:

card connector means for connecting said memory card to said apparatus;

table forming means for forming, in said memory card, a memory allocation table containing values identifying storage units arranged in groups of storage units containing related information;

directory forming means for forming, in said memory card, a directory containing values identifying a first storage unit in each of said groups of storage units containing related information;

control means for controlling said table forming means and said directory forming means to store information in each of the plurality of storage units; and a storage unit table for indicating whether storage units identified in the memory allocation table are empty or occupied;

said control means reading each location in said directory and determining whether a read directory location corresponds to a first storage unit that is occupied; p1 said control means tracing each location in said memory allocation table which is associated with said first storage unit that is occupied, and storing a value in said storage unit table indicating whether the storage units designated by traced locations in the memory allocation table are occupied and effectively identifying each location in the memory allocation table which lacks coincidence with the corresponding directory location by indicating as empty in the storage unit table those storage locations into traced; and said control means writing information in the memory card based on information in one of said memory allocation table and said storage unit table, and prior to writing information in the memory card identifies one or more of the plurality of storage units which are empty and not write inhibited and writes the information to at least one of the identified storage units being empty and not write inhibited, and if none of the plurality of storage units are empty and not write inhibited identifies one or more of the plurality of storage units which are occupied and not write inhibited and writes the information to at least one of the identified storage units being occupied and not write inhibited, and prohibits writing to a storage unit being write inhibited.

* * * * *